(12) United States Patent
Wang et al.

(10) Patent No.: US 9,400,848 B2
(45) Date of Patent: Jul. 26, 2016

(54) TECHNIQUES FOR CONTEXT-BASED GROUPING OF MESSAGES FOR TRANSLATION

(71) Applicant: Google Inc., Mountain View, CA (US)

(72) Inventors: Xiaoming Wang, Shanghai (CN); Xi Cheng, Beijing (CN)

(73) Assignee: Google Inc., Mountain View, CA (US)

( * ) Notice: Subject to any disclaimer, the term of this patent is extended or adjusted under 35 U.S.C. 154(b) by 600 days.

(21) Appl. No.: 13/627,045

(22) Filed: Sep. 26, 2012

(65) Prior Publication Data

US 2014/0089382 A1    Mar. 27, 2014

(51) Int. Cl.
*G06F 15/16*    (2006.01)
*G06F 17/30*    (2006.01)

(52) U.S. Cl.
CPC ................................. *G06F 17/3089* (2013.01)

(58) Field of Classification Search
CPC ......... H04L 67/02; H04L 51/14; H04L 51/28; G06F 17/3089
USPC .......................................................... 709/203
See application file for complete search history.

(56) References Cited

U.S. PATENT DOCUMENTS

| | | | |
|---|---|---|---|
| 2003/0115552 A1* | 6/2003 | Jahnke et al. ................. | 715/536 |
| 2005/0197826 A1* | 9/2005 | Neeman ............ | G06F 17/30864 |
| | | | 704/2 |
| 2006/0293874 A1* | 12/2006 | Zhang ................... | G06F 17/289 |
| | | | 704/2 |
| 2008/0222273 A1* | 9/2008 | Lakshmanan et al. ........ | 709/219 |
| 2010/0115424 A1 | 5/2010 | Young et al. | |
| 2013/0124185 A1* | 5/2013 | Sarr ....................... | G06F 17/289 |
| | | | 704/2 |

OTHER PUBLICATIONS

PCT International Search Report and Written Opinion dated Jan. 29, 2014 for PCT International Application No. PCT/US2013/056740, 7 pages.

* cited by examiner

*Primary Examiner* — Kevin Bates
*Assistant Examiner* — SM Rahman
(74) *Attorney, Agent, or Firm* — Remarck Law Group PLC (57) ABSTRACT

A computer-implemented technique includes receiving, at a server, a first request from a computing device to translate a web page from a source language to a target language. The technique includes generating, at the server, an image for each of a plurality of messages from the web page to obtain a plurality of images in response to the first request. A specific image (i) represents at least a specific portion of the web page and (ii) includes at least a specific message of the plurality of messages. The technique includes grouping, at the server, the plurality of messages based on contexts of their images to obtain one or more groups of messages. A translation service provider then translates the one or more groups of messages to obtain a plurality of translated messages. The technique also includes transmitting, from the server, the plurality of translated messages to the computing device.

20 Claims, 3 Drawing Sheets

TECHNIQUES FOR CONTEXT-BASED GROUPING OF MESSAGES FOR TRANSLATION

FIELD

The present disclosure relates to language translation and, more particularly, to techniques for context-based grouping of messages for translation.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A user may access a website from a computing device via a network such as the Internet. The website may display a web page to the user via a web browser executing on the computing device. The web page may include images, videos, text, or a combination thereof, to be displayed to the user on a display associated with the computing device.

SUMMARY

A computer-implemented technique is presented. The technique can include receiving, at a server including one or more processors, a first request for a web page from a computing device via a network, the computing device being associated with a user. The technique can include transmitting, from the server, a source document for the web page to the computing device via the network in response to receiving the first request, the source document being in a source language. The technique can include receiving, at the server, a second request from the computing device to translate a web page from the source language to a target language that is understandable by the user, wherein the web page includes a plurality of messages to be translated. The technique can include generating, at the server, an image for each of the plurality of messages to obtain a plurality of images, wherein a specific image (i) represents at least a portion of the web page and (ii) includes at least a specific message of the plurality of messages. The technique can include grouping, at the server, the plurality of messages by matching a specific image of the plurality of images to one or more of a remainder of the plurality images to obtain one or more groups of messages, wherein each group of messages is associated with two or more matching images. The technique can include transmitting, from the server, the one or more groups of messages to a translation service provider associated with one or more human translators. The technique can include receiving, at the server, a plurality of translated messages from the translation service provider, the plurality of translated messages being translations of the plurality of messages from the source language to the target language by the one or more human translators. The technique can also include transmitting, from the server, the plurality of translated messages to the computing device associated with the user, wherein receipt of the plurality of translated messages causes the computing device to output the web page in the target language to the user.

Another computer-implemented technique is also presented. The technique can include receiving, at a server including one or more processors, a first request from a computing device associated with a user to translate a web page from a source language to a target language, wherein the web page includes a plurality of messages to be translated. The technique can include generating, at the server, an image for each of the plurality of messages to obtain a plurality of images in response to the first request, wherein a specific image (i) represents at least a specific portion of the web page and (ii) includes at least a specific message of the plurality of messages. The technique can include grouping, at the server, the plurality of messages based on contexts of their images to obtain one or more groups of messages. The technique can include transmitting, from the server, the one or more groups of messages to a translation service provider associated with one or more human translators. The technique can include receiving, at the server, a plurality of translated messages from the translation service provider, the plurality of translated messages being translations of the plurality of messages from the source language to the target language by the one or more human translators. The technique can also include transmitting, from the server, the plurality of translated messages to the computing device, wherein receipt of the plurality of translated messages causes the computing device to output the web page in the target language to the user.

In some embodiments, the technique further includes: obtaining, at the server, a source document for the web page, and rendering, at the server, the web page using the source document.

In other embodiments, each specific image is a screenshot of the specific portion of the web page.

In some embodiments, grouping the plurality of messages based on their contexts to obtain the one or more groups of messages includes matching, at the server, the specific image of the plurality of images to one or more of a remainder of the plurality images to obtain one or more groups of messages, wherein each group of messages is associated with two or more matching images.

In other embodiments, the technique further includes storing, at the server, a thumbnail image for each of the plurality of images, wherein a specific thumbnail image has a lower resolution than its corresponding image, and wherein each group of messages is associated with two or more matching thumbnail images.

In some embodiments, matching the specific image of the plurality of images to one or more of the remainder of the plurality of images to obtain the one or more groups of messages includes determining, at the server, an exact match between the specific image and the one or more of the remainder of the plurality of images.

In other embodiments, matching the specific image of the plurality of images to one or more of the remainder of the plurality of images to obtain the one or more groups of messages includes: determining, at the server, a degree of similarity between the specific image and the one or more of the remainder of the plurality of images, and determining, at the server, a match when the degree of similarity is greater than a predetermined threshold indicative of an acceptable likelihood that two images are contextually related.

In some embodiments, transmitting, from the server, the one or more groups of messages to the translation service provider further includes transmitting, from the server, the one or more images corresponding to the one or more groups of messages to the translation service provider, the one or more images being used by the one or more human translators to obtain the plurality of translated messages.

In other embodiments, grouping the plurality of messages based on the contexts of their images to obtain one or more groups of messages includes using a heuristic algorithm.

In some embodiments, the technique further includes: receiving, at the server, a second request for a source document for the web page from the computing device, and transmitting, from the server, the source document for the web page to the computing device in response to receiving the second request, wherein the second request is received at the server and the source document is transmitted to the computing device before the first request is received at the server.

A server is also presented. The server can include a communication device and one or more processors. The communication device can be configured to receive a first request from a computing device associated with a user to translate a web page from a source language to a target language, wherein the web page includes a plurality of messages to be translated. The one or more processors can be configured to: generate an image for each of the plurality of messages to obtain a plurality of images in response to the first request, wherein a specific image (i) represents at least a specific portion of the web page and (ii) includes at least a specific message of the plurality of messages, and group the plurality of messages based on contexts of their images to obtain one or more groups of messages. The communication device can also be configured to: transmit the one or more groups of messages to a translation service provider associated with one or more human translators, receive a plurality of translated messages from the translation service provider, the plurality of translated messages being translations of the plurality of messages from the source language to the target language by the one or more human translators, and transmit the plurality of translated messages to the computing device, wherein receipt of the plurality of translated messages causes the computing device to output the web page in the target language to the user.

In some embodiments, the one or more processors are further configured to: obtain a source document for the web page, and render the web page using the source document.

In other embodiments, each specific image is a screenshot of the specific portion of the web page.

In some embodiments, the one or more processors are configured to group the plurality of messages based on their contexts to obtain the one or more groups of messages by matching the specific image of the plurality of images to one or more of a remainder of the plurality images to obtain one or more groups of messages, wherein each group of messages is associated with two or more matching images.

In other embodiments, the one or more processors are further configured to store a thumbnail image for each of the plurality of images, wherein a specific thumbnail image has a lower resolution than its corresponding image, and wherein each group of messages is associated with two or more matching thumbnail images.

In some embodiments, the one or more processors are configured to match the specific image of the plurality of images to one or more of the remainder of the plurality of images to obtain the one or more groups of messages by determining an exact match between the specific image and the one or more of the remainder of the plurality of images.

In other embodiments, the one or more processors are configured to match the specific image of the plurality of images to one or more of the remainder of the plurality of images to obtain the one or more groups of messages by: determining a degree of similarity between the specific image and the one or more of the remainder of the plurality of images, and determining a match when the degree of similarity is greater than a predetermined threshold indicative of an acceptable likelihood that two images are contextually related.

In some embodiments, the communication device is configured to transmit the one or more groups of messages to the translation service provider by transmitting the one or more images corresponding to the one or more groups of messages to the translation service provider, the one or more images being used by the one or more human translators to obtain the plurality of translated messages.

In other embodiments, the communication device is further configured to: receive a second request for a source document for the web page from the computing device, and transmit the source document for the web page to the computing device in response to receiving the second request, wherein the second request is received at the server and the source document is transmitted to the computing device before the first request is received at the server.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As previously mentioned, a user may access a website that displays a web page including images, videos, text, or a combination thereof. Given the worldwide reach of the Internet, the web page may have been created in a language that the user cannot understand. In particular, the user may not be able to understand the text of the web page. The user, therefore, may request to translate the web page from its source language to a target language that the user can understand.

The text of the web page can be divided into a plurality of messages. A message can refer to a distinct portion of the text of the web page. For example, each of the plurality of messages can reference a different topic on the web page. Translations service providers can translate the plurality of messages to the target language using one or more human translators. The human translators, however, may receive a group or a subset of the plurality of messages without any additional context.

More than one of the plurality of messages, however, may reference the same topic on the web page, e.g., sports. These messages can be referred to as having the same context. Therefore, by providing a human translator with a group of messages including messages that each have the same or similar context, the speed and/or accuracy of the translation of the group of messages by the human translator can be increased.

Accordingly, techniques are presented for context-based grouping of messages for translation. The techniques can provide for faster and/or more accurate translation by human translators. The techniques can receive, at a server including one or more processors, a first request from a computing device to translate a web page from a source language to a target language. The web page can include a plurality of messages to be translated. The techniques can generate, at the server, an image for each of the plurality of messages to obtain a plurality of images in response to the first request. A specific image can (i) represent at least a specific portion of the web page and (ii) include at least a specific message of the plurality of messages. The techniques can group, at the server, the plurality of messages based on the contexts of their images to obtain one or more groups of messages. In some implementations, for example, the techniques can group messages having exact matching images or having greater than a predetermined degree of similarity.

The techniques can transmit, from the server, the one or more groups of messages to a translation service provider associated with one or more human translators. The techniques can receive, at the server, a plurality of translated messages from the translation service provider. The plurality of translated electronic messages can be translations of the plurality of electronic messages from the source language to the target language by the one or more human translators. The techniques can also transmit, from the server, the plurality of translated messages to the computing device associated with the user. Alternatively, for example, the translation service provider can provide the plurality of translated messages directly to the computing device. Receiving the plurality of translated messages can cause the computing device to output the web page in the target language to the user.

Figure 1:
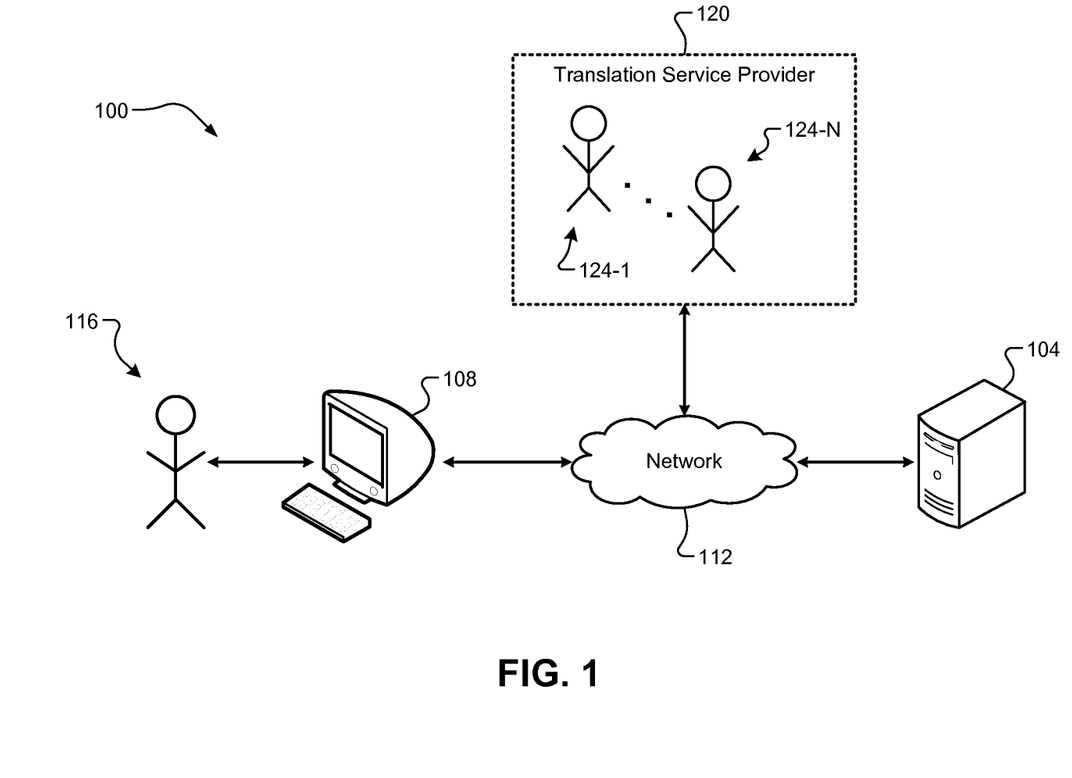
FIG. 1 is a diagram of a computing network including an example server according to some implementations of the present disclosure.

Referring now to FIG. 1, a diagram of a computing network 100 including an example server 104 according to some implementations of the present disclosure is illustrated. It should be appreciated that the term "server" as used herein can refer to any suitable computing device including one or more processors. The server 104 can communicate with a computing device 108 (a desktop computer, a laptop computer, a tablet computer, a mobile phone, etc.) via a network 112. The network 112 can include a local area network (LAN), a wide area network (WAN), e.g., the Internet, or a combination thereof. The computing device 108 can be associated with a user 116. For example, the computing device 108 can execute web browser software and the user 116 can interact with a web page displayed at the computing device 108 via the web browser software.

The computing device 108 can transmit a first request from the user 116 for a web page to the server 104 via the network 112. In response to receiving the first request, the server 104 can transmit the web page, e.g., a source document, to the computing device 108 via the network 112. It should be appreciated that the term "server" as used herein can also refer to two or more servers operating in a parallel or distributed architecture. For example, one server may be used for hosting and providing the web page to the computing device 108 while another server may be used for translation of the web page. When the web page is presented in a language that the user 116 cannot understand, the computing device 108 may transmit a second request to translate the web page from the user 116 to the server 104 via the network 112.

In response to receiving the second request, the server 104 can group a plurality of messages from the web page into one or more groups based on their context according to the techniques of the present disclosure. The server 104 can then provide the one or more groups of messages to a translation service provider 120. The translation service provider 120 can be located either locally or remotely via the network 112. It should be appreciated that the term "translation service provider" as used herein can also refer to one or more computing devices associated with one or more human translators. As illustrated, the translation service provider 120 can include one or more human translators 124-1 . . . 124-N (collectively "one or more human translators 124" or "human translators 124," where N≥1).

The one or more human translators 124 can translate the one or more groups of messages, respectively, to a target language that is understandable by the user 116 to obtain a plurality of translated messages. In some implementations, the one or more groups of messages may be replaced by the one or more corresponding images, and the human translators 124 can perform translation using the one or more corresponding images to obtain the plurality of translated messages. The translation service provider 120 can then provide the plurality of translated messages to the computing device 108 via the network 112 either directly or via the server 104. The computing device 108 can then replace the plurality of messages with the plurality of translated messages.

Figure 2:
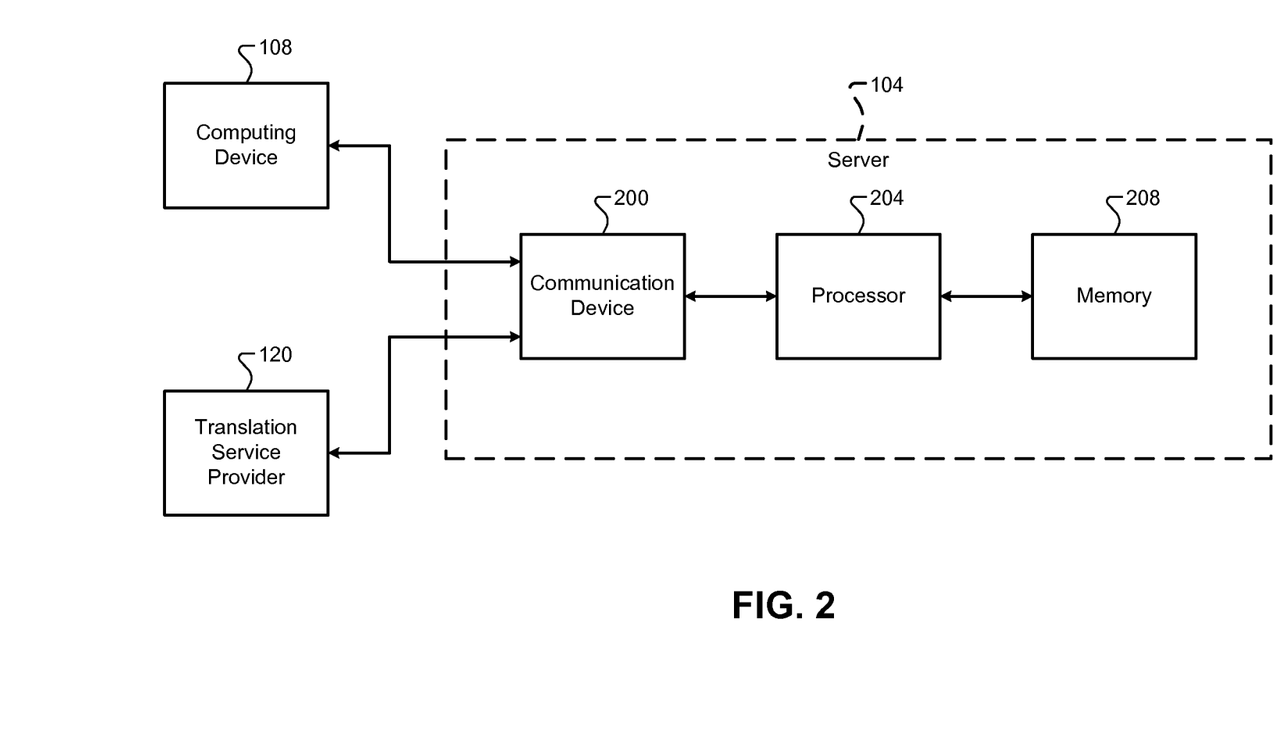
FIG. 2 is a functional block diagram of the example server of FIG. 1.

Referring now to FIG. 2, a functional block diagram of the example server 104 of FIG. 1 is illustrated. The server 104 can include a communication device 200, a processor 204, and a memory 208. It should be appreciated that the term "processor" as used herein can refer to either a single processor or two or more processors operating in a parallel or distributed architecture.

The communication device 200 can control communication between the server 104 and other devices via the network 112. Specifically, the communication device 200 can control communication between the server 104 and the computing device 108 and/or the translation service provider 120. The communication device 200 can include any suitable components configured for communication via the network 112, e.g., a transceiver. As previously described, the communication device 200 can receive the first request for the web page from the computing device 108 and, in some cases, the second request to translate the web page from the computing device 108 and the plurality of translated messages from the translation service provider 120. The communication device 200 can also transmit the web page, e.g., the source document, to the computing device 108 and, in some cases, the one or more groups of messages to the translation service provider 120 and the plurality of translated messages to the computing device 108.

The processor 204 can control operation of the server 104. For example, the processor 204 can control operations including, but not limited to, loading and executing an operating system of the server 104, controlling communication via the communication device 200, and/or controlling read/write operations at the memory 208. The processor 204 can also execute the techniques of the present disclosure. Specifically, in response to receiving the second request to translate the web page from the computing device 108, the processor 204 can group the plurality of messages of the web page based on their context to obtain the one or more groups of messages. It should be appreciated that the term "web page" as used herein can also refer to two or more web pages and, therefore, the context-based grouping techniques of the present disclosure may be applied on a page-by-page basis or to a plurality of web pages. For example only, the context-based grouping techniques of the present disclosure may utilize heuristic algorithms.

The processor 204 can determine the context of a specific message based on an image of the web page that includes the specific message. The processor 204, therefore, may render the web page at the server 104 in order to then perform the image processing of the web page. For example, the image for the specific message may be a screenshot of a portion of the web page, which may also be referred to as a "snapshot" image. The processor 204 can determine a context of a specific message by comparing its corresponding image with the images corresponding to a remainder of the plurality of messages. The processor 204 can then group messages having a same or similar context. In some implementations, the processor 204 may group messages having matching images. For example, the processor 204 may store the image as a thumbnail image for each of the plurality of messages. The processor 204 can then match the thumbnail images for the various messages in order to determine the one or more groups of messages. A thumbnail image can refer to an image having a lower resolution than the corresponding image, which can decrease storage requirements at the memory 208 and/or decrease processing times by the processor 204.

It should be appreciated that other techniques of context-based grouping can be implemented. For example, the processor 204 may group messages having images that have greater than a certain degree of similarity. More specifically, the processor 204 can determine a degree of similarity between each image and a remainder of the plurality of images. The processor 204 can then determine a match in order to group two images together when the degree of similarity between the two images is greater than a predetermined degree of similarity, or a predetermined threshold. The predetermined threshold can be indicative of an acceptable likelihood that two images are contextually related. The degree of similarity for two images may be determined using any suitable image comparison technique. The memory 208 can store information at the server 104. The memory 208 can be any suitable storage medium (flash, hard disk, etc.). In some implementations, for example, the memory 208 can store the source document for the web page. Additionally or alternatively, for example, the memory 208 can store the images (screenshots, thumbnails, etc.) captured during the context-based grouping according to the techniques of the present disclosure.

After the processor 204 obtains the one or more groups of messages, the communication device 200 can transmit the one or more groups of messages to the translation service provider 120, e.g., via the network 112. The communication device 200 can then receive the plurality of translated messages from the translation service provider 120, which can be generated by the one or more human translators 124 from the one or more groups of messages, respectively. The processor 204 may process the plurality of translated messages. For example, the processor 204 may modify the web page (the source document) to include the plurality of translated messages in place of the plurality of messages. Alternatively, for example, the processor 204 may attach instructions to the plurality of translated messages that cause the web browser executing on the computing device 108 to present the plurality of translated messages to the user 116 in the web page. The communication device 200 can then transmit the modified source document or the plurality of translated messages and attached instructions to the computing device 108 via the network 112.

Figure 3:
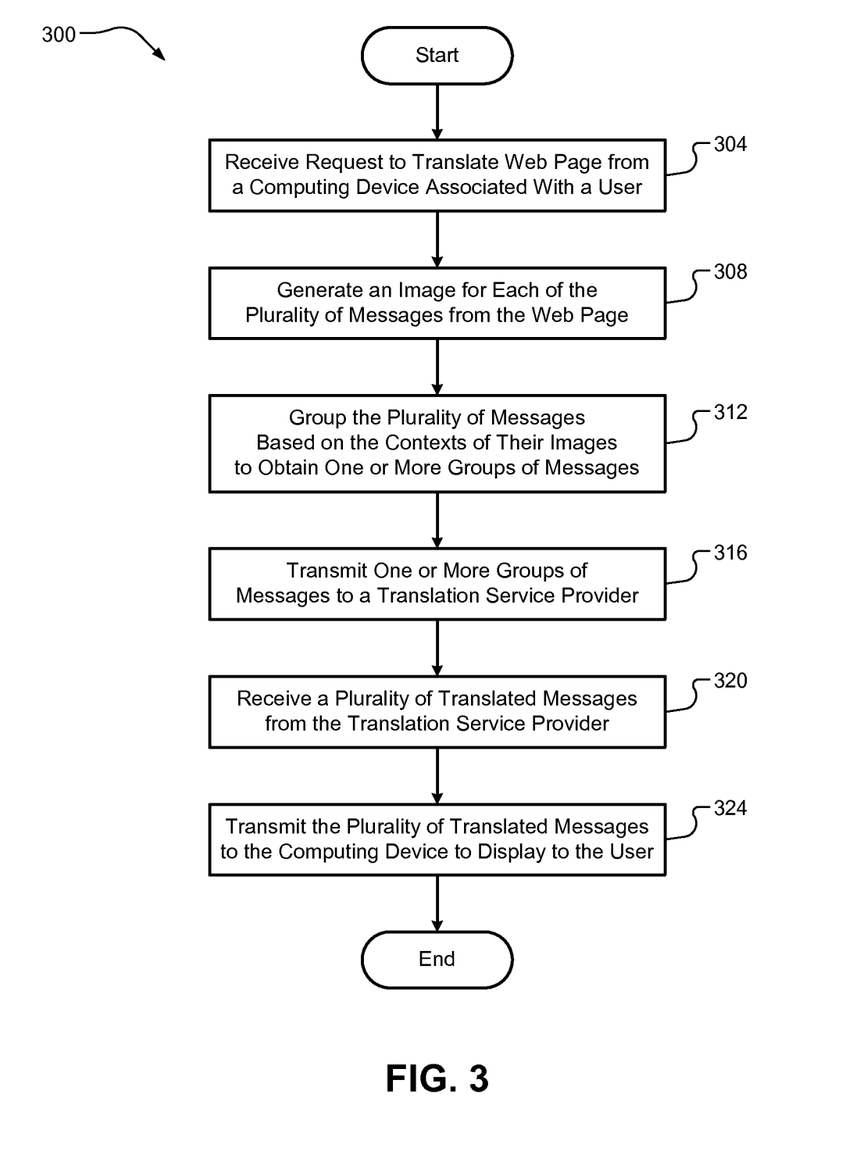
FIG. 3 is a flow diagram of an example technique for context-based grouping of electronic messages according to some implementations of the present disclosure.

Referring now to FIG. 3, a flow diagram of an example technique 300 for context-based grouping of messages for translation according to some implementations of the present disclosure is illustrated. At 304, the server 104 can receive a first request from a computing device to translate a web page from a source language to a target language. The web page can include a plurality of messages to be translated. At 308, the server 104 can generate an image for each of the plurality of messages to obtain a plurality of images in response to the first request. A specific image can (i) represent at least a specific portion of the web page and (ii) include at least a specific message of the plurality of messages. At 312, the server 104 can group the plurality of messages based on the contexts of their images to obtain one or more groups of messages. At 316, the server 104 can transmit the one or more groups of messages to a translation service provider associated with one or more human translators 124. At 320, the server 104 can receive a plurality of translated messages from the translation service provider 120. The plurality of translated electronic messages represents translations of the plurality of electronic messages from the source language to the target language by the one or more human translators 124. At 324, the server 104 can transmit the plurality of translated messages to the computing device associated with the user 116. Receiving the plurality of translated messages can cause the computing device 108 to output the web page in the target language to the user 116. The technique 300 can then end or return to 304 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
   receiving, at a server including one or more processors, a first request for a web page from a computing device via a network, the computing device being associated with a user;
   transmitting, from the server, a source document for the web page to the computing device via the network in response to receiving the first request, the source document being in a source language;
   receiving, at the server, a second request from the computing device to translate the web page from the source language to a target language that is understandable by the user, wherein the web page includes a plurality of messages to be translated;
   rendering, at the server, the web page using the source document, wherein each message is a portion of a text of the rendered web page;
   generating, at the server, an image for each of the plurality of messages to obtain a plurality of images, wherein a specific image (i) is a screenshot of at least a portion of the rendered web page and (ii) includes at least a specific message of the plurality of messages;
   grouping, at the server, the plurality of messages by matching a specific image of the plurality of images to one or more of a remainder of the plurality images to obtain one or more groups of messages, wherein each group of messages is associated with two or more matching images;
   transmitting, from the server and to a translation service provider associated with one or more human translators, (i) the one or more groups of messages and (ii) a translation directive for each group of messages, wherein each translation directive indicates the target language;

receiving, at the server, a plurality of translated messages from the translation service provider, the plurality of translated messages being translations of the plurality of messages from the source language to the target language by the one or more human translators; and transmitting, from the server, the plurality of translated messages to the computing device associated with the user, wherein receipt of the plurality of translated messages causes the computing device to output the web page in the target language to the user.

2. A computer-implemented method, comprising:

receiving, at a server including one or more processors, a first request from a computing device associated with a user to translate a web page from a source language to a target language, wherein the web page includes a plurality of messages to be translated;

obtaining, at the server, a source document for the web page;

rendering, at the server, the web page using the source document, wherein each message is a portion of a text of the rendered web page;

generating, at the server, an image for each of the plurality of messages to obtain a plurality of images in response to the first request, wherein a specific image (i) is a screenshot of at least a specific portion of the rendered web page and (ii) includes at least a specific message of the plurality of messages;

grouping, at the server, the plurality of messages based on contexts of their images to obtain one or more groups of messages;

transmitting, from the server and to a translation service provider associated with one or more human translators, (i) the one or more groups of messages and (ii) a translation directive for each group of messages, wherein each translation directive indicates the target language;

receiving, at the server, a plurality of translated messages from the translation service provider, the plurality of translated messages being translations of the plurality of messages from the source language to the target language by the one or more human translators; and transmitting, from the server, the plurality of translated messages to the computing device, wherein receipt of the plurality of translated messages causes the computing device to output the web page in the target language to the user.

3. The computer-implemented method of claim 2, wherein grouping the plurality of messages based on their contexts to obtain the one or more groups of messages includes matching, at the server, the specific image of the plurality of images to one or more of a remainder of the plurality images to obtain one or more groups of messages, wherein each group of messages is associated with two or more matching images.

4. The computer-implemented method of claim 2, further comprising storing, at the server, a thumbnail image for each of the plurality of images, wherein a specific thumbnail image has a lower resolution than its corresponding image, and wherein each group of messages is associated with two or more matching thumbnail images.

5. The computer-implemented method of claim 3, wherein matching the specific image of the plurality of images to one or more of the remainder of the plurality of images to obtain the one or more groups of messages includes determining, at the server, an exact match between the specific image and the one or more of the remainder of the plurality of images.

6. The computer-implemented method of claim 3, wherein matching the specific image of the plurality of images to one or more of the remainder of the plurality of images to obtain the one or more groups of messages includes:

determining, at the server, a degree of similarity between the specific image and the one or more of the remainder of the plurality of images; and determining, at the server, a match when the degree of similarity is greater than a predetermined threshold indicative of an acceptable likelihood that two images are contextually related.

7. The computer-implemented method of claim 2, wherein transmitting, from the server, the one or more groups of messages to the translation service provider further includes transmitting, from the server, the one or more images corresponding to the one or more groups of messages to the translation service provider, the one or more images being used by the one or more human translators to obtain the plurality of translated messages.

8. The computer-implemented method of claim 2, wherein grouping the plurality of messages based on the contexts of their images to obtain one or more groups of messages includes using a heuristic algorithm.

9. The computer-implemented method of claim 2, further comprising:

receiving, at the server, a second request for the source document for the web page from the computing device; and transmitting, from the server, the source document for the web page to the computing device in response to receiving the second request, wherein the second request is received at the server and the source document is transmitted to the computing device before the first request is received at the server.

10. The computer-implemented method of claim 2, wherein each message in a particular group of messages is from an image having a same topic.

11. The computer-implemented method of claim 2, further comprising obtaining, at the server, a thumbnail image for each image, each thumbnail image having a lower resolution than its corresponding image, wherein grouping the plurality of messages is performed based on contexts of their thumbnail images.

12. A server, comprising:

a communication device configured to receive (i) a first request from a computing device associated with a user to translate a web page from a source language to a target language and (ii) a source document for the web page, wherein the web page includes a plurality of messages to be translated; and one or more processors configured to:

render the web page using the source document, wherein each message is a portion of the text of the rendered web page, generate an image for each of the plurality of messages to obtain a plurality of images in response to the first request, wherein a specific image (i) is a screenshot of at least a specific portion of the rendered web page and (ii) includes at least a specific message of the plurality of messages, and group the plurality of messages based on contexts of their images to obtain one or more groups of messages, wherein the communication device is also configured to:

transmit, to a translation service provider associated with one or more human translators, (i) the one or more groups of messages and (ii) a translation directive for each group of messages, wherein each translation directive indicates the target language, receive a plurality of translated messages from the translation service provider, the plurality of translated messages being translations of the plurality of messages from the source language to the target language by the one or more human translators, and transmit the plurality of translated messages to the computing device, wherein receipt of the plurality of translated messages causes the computing device to output the web page in the target language to the user.

13. The server of claim 12, wherein the one or more processors are configured to group the plurality of messages based on their contexts to obtain the one or more groups of messages by matching the specific image of the plurality of images to one or more of a remainder of the plurality images to obtain one or more groups of messages, wherein each group of messages is associated with two or more matching images.

14. The server of claim 12, wherein the one or more processors are further configured to store a thumbnail image for each of the plurality of images, wherein a specific thumbnail image has a lower resolution than its corresponding image, and wherein each group of messages is associated with two or more matching thumbnail images.

15. The server of claim 13, wherein the one or more processors are configured to match the specific image of the plurality of images to one or more of the remainder of the plurality of images to obtain the one or more groups of messages by determining an exact match between the specific image and the one or more of the remainder of the plurality of images.

16. The server of claim 13, wherein the one or more processors are configured to match the specific image of the plurality of images to one or more of the remainder of the plurality of images to obtain the one or more groups of messages by:

determining a degree of similarity between the specific image and the one or more of the remainder of the plurality of images; and determining a match when the degree of similarity is greater than a predetermined threshold indicative of an acceptable likelihood that two images are contextually related.

17. The server of claim 12, wherein the communication device is configured to transmit the one or more groups of messages to the translation service provider by transmitting the one or more images corresponding to the one or more groups of messages to the translation service provider, the one or more images being used by the one or more human translators to obtain the plurality of translated messages.

18. The server of claim 12, wherein the communication device is further configured to:

receive a second request for the source document for the web page from the computing device; and transmit the source document for the web page to the computing device in response to receiving the second request, wherein the second request is received at the server and the source document is transmitted to the computing device before the first request is received at the server.

19. The server of claim 12, wherein each message in a particular group of messages is from an image having a same topic.

20. The server of claim 12, wherein the one or more processors are further configured to obtain a thumbnail image for each image, each thumbnail image having a lower resolution than its corresponding image, and wherein grouping the plurality of messages is performed based on contexts of their thumbnail images.

* * * * *